United States Patent [19]
Benjamin

[11] 3,724,424
[45] Apr. 3, 1973

[54] PORTABLE KNOCK-DOWN ANIMAL ENCLOSURE

[76] Inventor: Marshall E. Benjamin, P.O. Box 727, Amarillo, Tex. 79105

[22] Filed: Apr. 30, 1971

[21] Appl. No.: 138,877

[52] U.S. Cl. ................................................119/16
[51] Int. Cl. ............................................A01k 01/02
[58] Field of Search........................119/16, 20, 51.11

[56] References Cited

UNITED STATES PATENTS

| | | |
|---|---|---|
| 3,256,858 | 6/1966 | Pals........................................119/16 |
| 3,234,911 | 2/1966 | Chubbuck..........................119/51.11 |
| 3,215,118 | 11/1965 | Behlen................................119/20 X |
| 2,712,677 | 7/1955 | Hyde....................................119/16 X |
| 3,216,396 | 11/1965 | Scamman..............................119/20 |
| 3,416,496 | 12/1968 | Peterson................................119/16 |

Primary Examiner—Hugh R. Chamblee
Attorney—Elton H. Brown, Jr.

[57] ABSTRACT

A structure for raising animals such as pigs with the animal completely out of contact with the ground. The enclosure is portable with the base forming a skid to permit the enclosure to be moved by dragging it with a tractor or other vehicle over the ground. The floor is completely removeable for replacement when sterilizing the structure after marketing one group of animals and before placing the next group in the enclosure. The enclosure is erected from prefabricated sections which can be shipped flat. The structure can be disassembled for additional shipment when required. Hinged covers are provided for the sides of the structure to serve as an awning in summer and to be dropped tight to the sides of the structure for warmth in winter.

5 Claims, 11 Drawing Figures

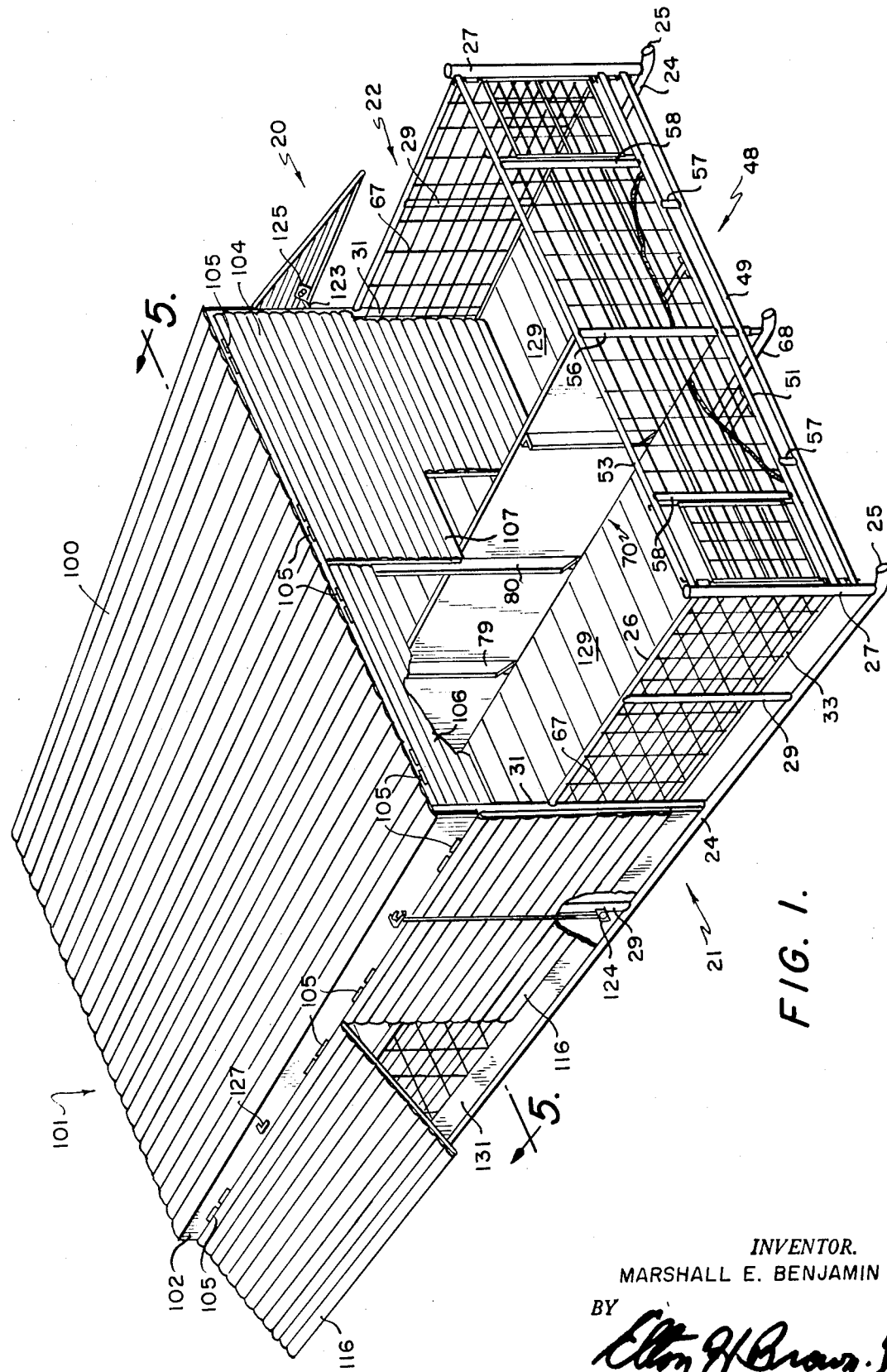

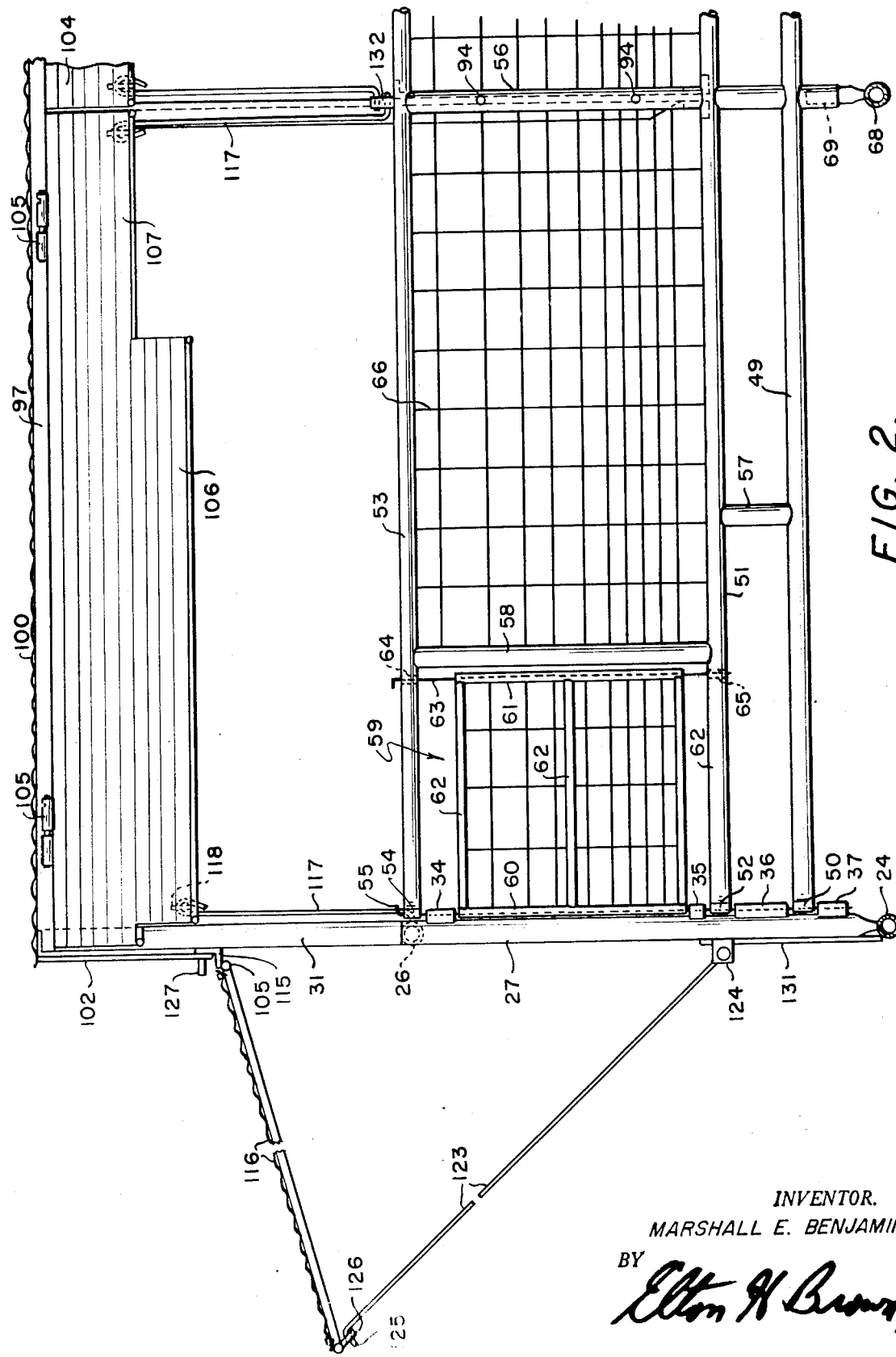

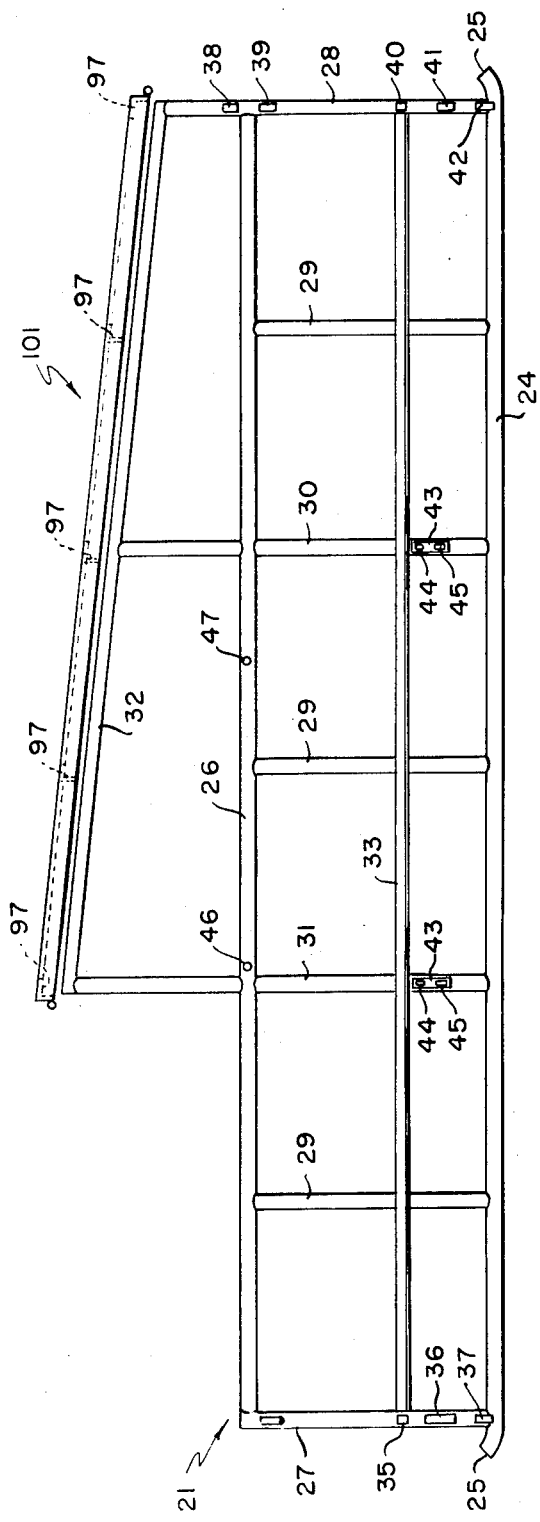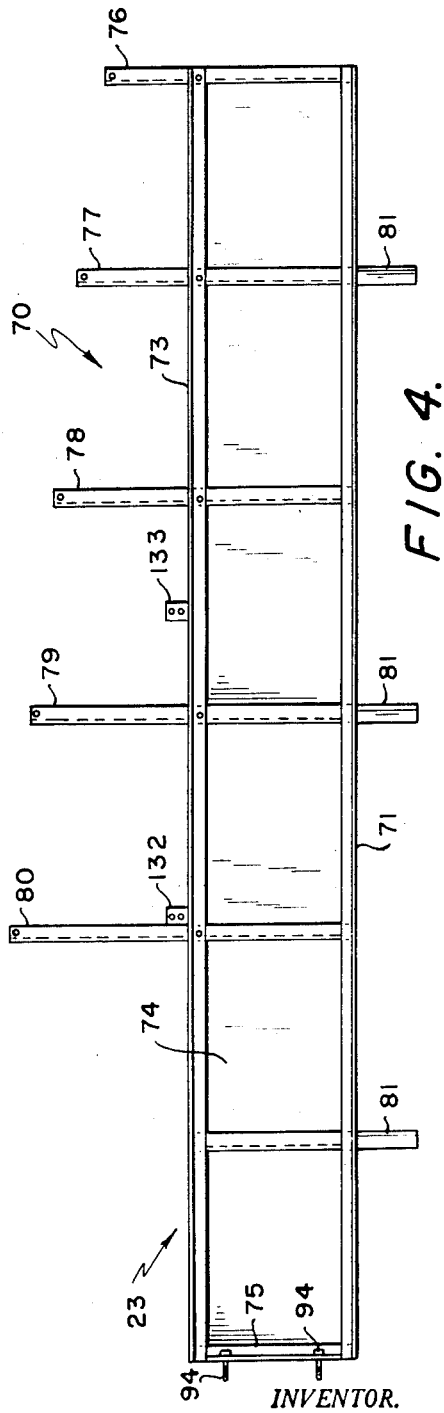

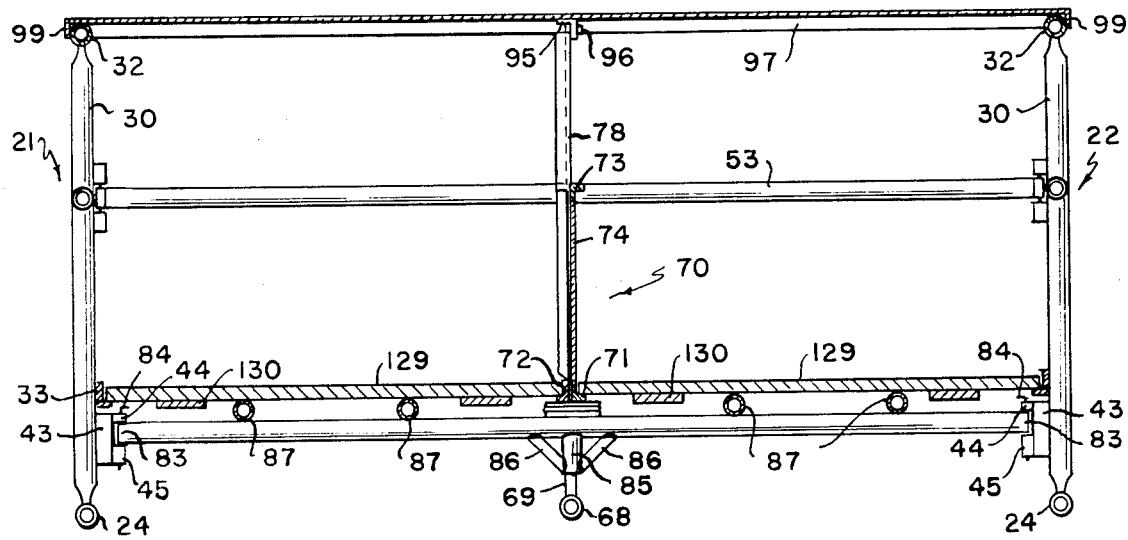
FIG. 5.
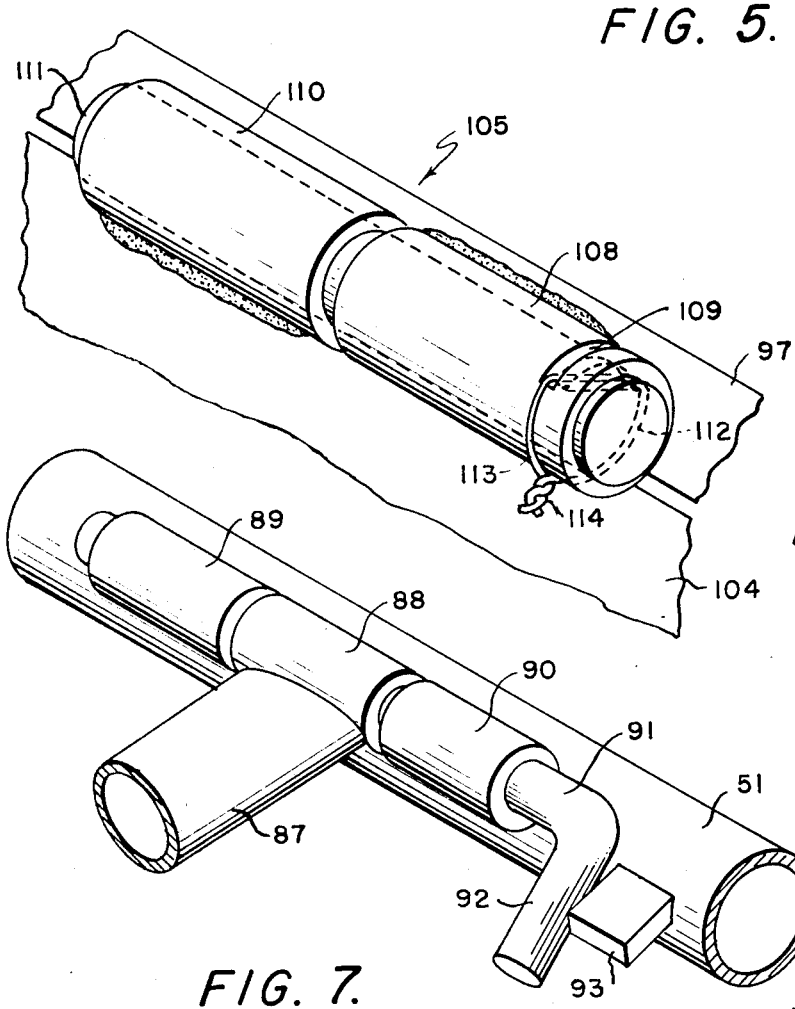
FIG. 6.
FIG. 7.
INVENTOR.
MARSHALL E. BENJAMIN
BY

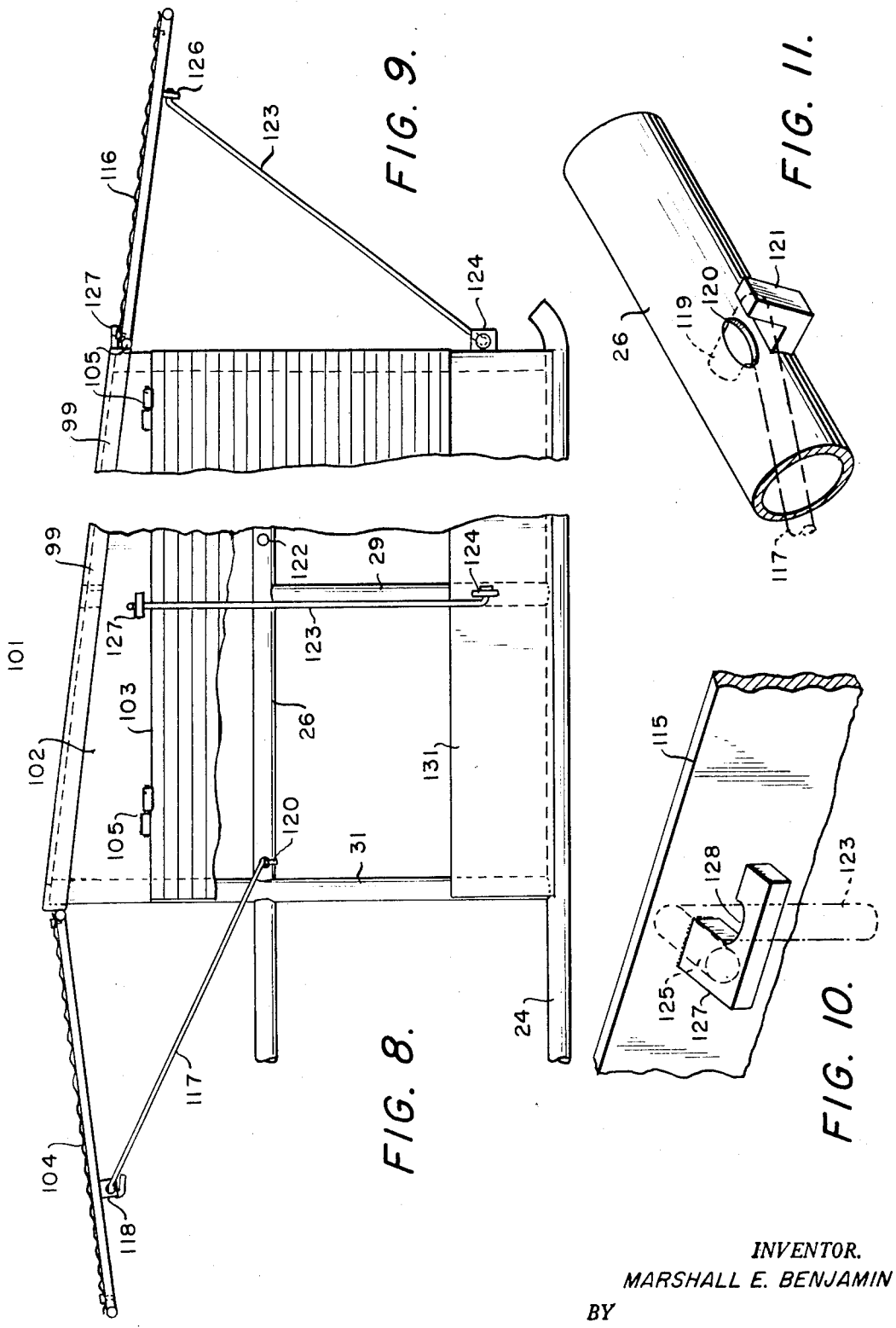

PORTABLE KNOCK-DOWN ANIMAL ENCLOSURE

BACKGROUND OF THE INVENTION

Field of the Invention

The present invention relates to the field of raising animals by the use of portable animal enclosures which keep the animals elevated well above the ground in an enclosure which can be moved from place to place as required.

SUMMARY OF THE INVENTION

The invention consists in general of a skid mounted platform having an open work fence surrounding the platform and a roof covering approximately two-thirds of the platform. The platform is formed of boards which are removeable with the remainder of the enclosure being of metal so that it can be steamed sterilized as required to prevent disease. The platform boards can be removed and replaced as required. Hinged panels are provided on the sides and the ends of the enclosure to serve as awnings in summer and as solid sides when dropped in winter. The device is built up from prefabricated sections which can be shipped flat and the device can be disassembled for further shipping as required.

The primary object of the invention is to provide a portable animal enclosure which can be inexpensively shipped, erected and used by relatively unskilled labor and which can be disassembled for shipment as required.

Other objects and advantages will become apparent in the following specification when considered in the light of the attached drawings.

BRIEF DESCRIPTION OF THE DRAWINGS

FIG. 1 is a perspective view of the invention shown partially broken away for convenience of illustration;

FIG. 2 is an enlarged fragmentary front elevation of the invention;

FIG. 3 is a side elevation of one of the prefabricated side sections and the roof panel;

FIG. 4 is a side elevation of the center partition frame;

FIG. 5 is a transverse sectional view taken along the line 5—5 of FIG. 1 looking in the direction of the arrows;

FIG. 6 is an enlarged fragmentary perspective view of one of the hinge elements used with the invention;

FIG. 7 is an enlarged fragmentary perspective view of one of the longitudinal support connectors;

FIG. 8 is a fragmentary side elevation of the invention;

FIG. 9 is a fragmentary side elevation of the invention;

FIG. 10 is a fragmentary perspective view of the side panel latch; and

FIG. 11 is a fragmentary perspective view of the front panel support latch.

DESCRIPTION OF THE PREFERRED EMBODIMENT

Referring now to the drawings in detail wherein like reference characters indicate like parts throughout the several figures the reference numeral 20 indicates generally a portable animal enclosure constructed in accordance with the invention.

The animal enclosure 20 includes a pair of oppositely disposed prefabricated side sections indicated generally at 21, 22 which are arranged in spaced apart parallel relation with a center partition frame indicated generally at 23 positioned therebetween and parallel thereto.

Each of the side sections 21 includes an elongate tubular skid 24 having upturned ends 25 to permit the skid 24 to slide easily over the surface of the ground in either direction. A tubular side rail 26 is arranged in vertically spaced parallel relation to the skid 24 and a front post 27 extends between the skid 24 and the rail 26 and is rigidly connected thereto. A rear post 28 is rigidly connected to the skid 24 and to the rail 26 at their rear end portions and extends above the rail 26. A plurality of short tubular posts 29 are connected at their lower ends to the skid 24 and at their upper ends to the rail 26. A tubular post 30 is connected at its lower end to the skid 24 and is connected to the rail 26 extending above the rail 26. A tubular post 31 is connected at its lower end to the skid 24 and extends upwardly therefrom to a point well above the rail 26. The post 31 is rigidly connected to the rail 26. A tubular roof support 32 is rigidly connected to the upper ends of the posts 28, 30, 31 and slopes at an angle downwardly from its forward portion at the post 31 to its rear portion at the post 28.

An angle iron floor support 33 is arranged parallel to the skid 24 and spaced thereabove as can be seen in FIG. 3. The support 33 is rigidly connected to each of the posts 27, 28, 29, 30 and 31 at the points where they contact.

The post 27 has an upright tubular member 34 secured thereto adjacent the rail 26. A second tubular member 35 is secured to the post 27 at a point adjacent the floor support 33. A third tubular member 36 is secured to the post 27 spaced below the tubular member 35 and a fourth tubular member 37 is secured to the post 27 spaced below the tubular member 36. The tubular members 34, 35, 36 and 37 are arranged in axially aligned relation for reasons to be assigned. A tubular member 38 is secured to the post 28 at a point spaced slightly above the side rail 26. A second tubular member 39 is secured to the post 28 spaced below the tubular member 38. A third tubular member 40 is secured to the post 28 at about the level of the floor support 33. A fourth tubular member 41 is secured to the post 28 spaced below the tubular member 40 and a fifth tubular member 42 is secured to the post 28 spaced below the tubular member 41 and at approximately the level of the skid 24. The tubular members 38, 39, 40, 41 and 42 are arranged in axially aligned relation for reasons to be assigned.

An upright plate 43 is secured to the inner face of the lower portion of each of the posts 30, 31 and have a pair of axially aligned vertically spaced tubular members 44, 45 rigidly secured thereto for reasons to be assigned.

The side rail 26 has a horizontal bore 46 opening therein adjacent the post 31 and a second bore 47 intermediate the post 29 and the post 30. The side section 21 and side section 22 are mirror image twins with all elements thereof carrying the same reference numerals.

The side section 21 is arranged in spaced parallel relation to the side section 22 and they are connected by the front section generally indicated at 48. The front section 48 includes a tubular bottom rail 49 having upright tubular members 50 rigidly secured to each end thereof. A tubular intermediate rail 51 is arranged parallel to the bottom rail 49 and is vertically spaced thereabove. The intermediate rail 51 has an upright tubular member 52 rigidly secured to each end thereof. A tubular top rail 53 is positioned parallel to the rails 49, 51 at a level corresponding to the side rails 26. The top rail 53 has an upright tubular member 54 rigidly secured to each end thereof. The tubular members 50, 52 and 54 are arranged in axially aligned relation and are adapted to align with the tubular members 34, 35, 36 and 37 to permit an elongate rod 55 to extend therethrough securing the front section 48 to the side sections 21, 22. An upright tubular post 56 extends from a point below the bottom rail 49 to the top rail 53 and is rigidly secured thereto as well as to the intermediate rail 51. A stub post 57 extends between and is secured to the bottom rail 49 and the intermediate rail 51 intermediate the tubular post 56 and the opposite end of the bottom rail 49 and the intermediate rail 51.

An upright post 58 extends between and is rigidly secured to the intermediate rail 51 and the top rail 53 adjacent to but spaced from the front post 27. A gate generally indicated at 59 is of generally rectangular form and includes an upright tubular side member 60 and an upright tubular side member 61 rigidly connected by a plurality of transverse frame members 62. The tubular member 60 is adapted to be pivotally mounted on the elongate rod 55 to hinge the gate 59 to the post 27. An elongate rod 63 is adapted to engage through a bore 64 in the top rail 53 and a bore 65 in the intermediate rail 51 passing through the tubular side member 61 to lock the gate 59 in closed position. Fence wire 66 extends between the post 58 and from the intermediate rail 51 up to the top rail 53 and is welded thereto. Fence wire 67 extends between the front post 27 and the rear post 28 of the side sections 21, 22 extending from the side rail 26 down to the floor support 33 and is welded thereto.

An elongate center skid 68 is positioned intermediate and parallel to the skids 24. The skid 68 is provided with a plurality of upstanding stub post 69 arranged in spaced apart parallel relation therealong. The lower end of the post 56 is adapted to telescopically engage over the stub post 69 at the forward end of the skid 68.

A center partition generally indicated at 70 in FIG. 4 includes a pair of floor support angle iron frame members 71, 72 arranged in back to back relation and parallel to the skid 68. An angle iron frame member 73 is spaced above the frame members 71, 72 and extends parallel thereto. A generally flat panel 74 is secured between the frame member 71, 72 at its lower end and to the frame member 73 at its upper end. A vertical front frame 75 extends between and connects the frame member 71, 72 to the frame member 73. A vertical frame member 76 extends between and connects the frame member 71, 72, 73 at the rear ends thereof and projects above the frame member 73. A plurality of angle iron post 77, 78, 79 and 80 are arranged in spaced apart upright relation and connect the frame members 71, 72 with the frame member 73 projecting above the frame member 73. The tops of the frame member 76 and the post 77, 78, 79 and 80 are successively longer to correspond to the slope of the roof support 32.

A plurality of tubular legs 81 are secured to and project perpendicularly downwardly from the frame members 71, 72 to engage over the stub post 69. A plurality of transverse tubular beams 82 extend between the side sections 21, 22 and engage between the tubular member 44 and tubular member 45 at each end thereof. The beam 82 has an upright tubular end portion 83 on each end thereof and a pin 84 extends through the tubular members 44, 45 and the tubular end portion 83 to lock the beam 82 to the side sections 21, 22. A tubular leg 85 depends from the center of the beam 82 to engage over one of the stub posts 69. Angle braces 86 extend from the beam 82 to the lower end of the tubular leg 85 to assist in stiffening the tubular leg 85. The beams 82 extend between the posts 30, 31 of the side section 21 and the side section 22.

A plurality of longitudinal tubular beams 87 extend parallel to the side sections 21, 22 in spaced apart relation and extend from the front to the rear of the enclosure 20 supported on the tubular beams 82 intermediate their opposite ends. The beams 87 extend to the tubular intermediate rail 51 at each end thereof and have a horizontally extending tubular member 88 rigidly secured to each end thereof. A pair of horizontally extending axially aligned tubular members 89, 90 are secured to the intermediate rail 51 at the end of each of the beams 87 so that the tubular member 88 can engage therebetween to permit a horizontal pin 91 to be inserted therebetween. The pin 91 has a right angularly extending handle 92 on one end. A block 93 is secured to the rail 51 in a position to engage the handle 92 to prevent the pin 91 from being withdrawn from the tubular members 88, 89 and 90 until the pin 91 is rotated and the handle 92 is disengaged from the block 93.

A pair of bolts 94 extend forwardly from the front frame 75 of the center partition frame 23 and project through the tubular post 56 to secure the partition frame 23 thereto.

An angle iron roof support frame 95 extends from the post 80 to the frame member 76 and is bolted thereto by a plurality of bolts 96. The frame 95 is also bolted to the post 77, 78, 79 by bolts 96. A plurality of transverse roof support angle iron frames 97 rest on the opposite ends on the tubular frame roof supports 32 and centrally on the roof support frame 95. The opposite ends of the roof support frames 97 are secured to angle iron frame members 99 along the opposite side edges of the enclosure 20.

Corrugated metallic roofing 100 is detachably secured to the roof support frame 95, the roof support frames 97 and the angle iron frame members 99 so as to form a sloping roof generally indicated at 101 for the enclosure 20.

An elongate generally triangular side panel 102 having a horizontal lower edge 103 is secured to the side sections 21, 22 so as to extend down from the roof 101.

A corrugated iron door 104 is secured to the roof support frame 97 at the front edge of the roof 101 by a pair of hinges 105. A second corrugated iron door 106 is also secured to the roof support frame 97 at the front of the roof 101 by a pair of hinges 105. The doors 104, 106 are cut out at 107 to permit access to the interior of the enclosure 20.

Each of the hinges 105 include a cylindrical barrel 108 welded to the front roof support frame 97 with its axis extending horizontal. The barrel 108 is hollow and has a transverse slot 109 formed therein for reasons to be assigned. A second barrel 110 is rigidly secured to the top edge of the door 104 and has a hinge pin 111 rigidly secured therein and projecting therefrom to extend into the barrel 108. The hinge pin 111 is provided with an annular groove 112 which is adapted to be positioned in alignment with the slot 109 to receive a wire 113 which is engaged therein to lock the hinge pin 111 in the barrel 108 while permitting it to turn therein. The wire 113 is secured by twisting at 114 and can be easily removed for removing the doors 104, 106.

An angle iron side frame 115 extends horizontally of the side sections 21, 22 and has the lower edge of the side panel 102 secured thereto. A pair of corrugated iron side doors 116 are mounted on hinges 105 secured to the angle iron side frames 115.

The doors 104, 106 have a pair of support and latching rods 117 pivotally secured to a plate 118 carried by the doors 104, 106. The opposite end of the rod 117 has a right angular end portion 119 which is adapted to engage in a bore 120 in the side rail 26 to support the doors 104, 106 in open generally horizontal position. An L-shaped keeper 121 is secured to the side rail 26 adjacent the bore 120 to prevent the right angle end portion 119 from becoming easily dislodged from the bore 120. A second bore 122 in each of the side rails 26 is provided for receiving the right angle end portion 119 with the doors 104, 106 closed to latch the doors in closed position.

A support and latch rod 123 is associated with each of the doors 116 with the lower end of each of the rods 123 pivotally mounted in a plate 124 secured to the post 29. Each of the rods 123 are provided with a right angle extension 125 for engagement in an apertured plate 126 carried by the inner side of the door 116. A generally L-shaped latch plate 127 is secured to the side frame 115 overlying the plates 124 carrying the rods 123. The latch plate 127 has a detent portion 128 to receive and retain the rod 123 with the doors 116 closed. With the rod 123 latched to the latch plate 127 the doors 116 are securely fastened closed.

A pair of doors 116 are also hinged with hinges 105 to the rear of the enclosure 20 and are supported on rods 123 in the same manner as the doors 116 on the side of the enclosure 20. A plurality of floor boards 129 are supported on the angle iron floor supports 33 and the angle iron frame members 71, 72 at their opposite ends while centrally supported on the longitudinal tubular beams 87. The floor boards 129 are secured together by batten strips 130 into a plurality of floor board units which may be removed as required.

It should be understood that feeding devices and watering devices may be associated with the enclosure 20 and that openings may be made in the enclosure 20 to receive these units.

In many instances of raising animals, particularly pigs, a disease will develop in a group of pigs in a pig pen, and it becomes necessary to abandon the pen for a lengthy period of time in order that future generations of pigs will not become infected from the pen. When a disease develops in the pigs in the enclosure 20, the boards 129 are removed and burned or otherwise destroyed, and the complete enclosure 20 is then moved to a new point so that ground droppings will not be present to contaminate the pen, and the enclosure 20 is then stream cleaned to remove all dirt, germs, and the like. The enclosure 20 is then fitted with new floor boards, and is immediately ready for use with no possibility of transmitting the disease germs from the old generation to the new generation of pigs to be raised therein.

Aperture carrying cleats 132, 133 are mounted in upstanding horizontally spaced apart relation to serve as keepers for the rods 117 on the inner edges of the doors 104, 106 in closed and open position.

In the event that the enclosure 20 is to be moved a considerable distance it can be disassembled into its relatively flat prefabricated sections and moved to the new location on available truck transportation. In order that the enclosure 20 may be used in winter months elongate panels 131 are detachably secured to the side sections 21, 22 and to the front and rear of the enclosure 20 to close the area from the skids 24 up to the lower edges of the doors 116 at the floor 129.

Having thus described the preferred embodiment of the invention it should be understood that numerous structural modifications and adaptions may be resorted to without departing from the spirit of the invention.

What is claimed is:

1. A portable knock-down animal enclosure comprising a pair of spaced apart parallel ground engaging skid supported prefabricated side sections, a metal framework detachably connecting said side sections, a roof detachably supported on said side sections, a generally horizontal removeable wooden plank floor supported on and extending between said side sections, a plurality of doors hingedly secured to said roof section for pivotal movement about a horizontal axis for closing the front, rear and sides of said enclosure, means for supporting said doors in a downwardly and outwardly sloping raised position and for latching said doors in closed position, fence wire secured to said side sections and said front and rear frames extending upwardly from said floor to confine animals in said enclosure, said means for supporting and latching said doors including a support and latch rod adapted to engage beneath said door to support said door in open position and to engage over said door to latch said door in closed position, said doors having means on the lower inner edge portion thereof for detachable engagement with one end of said support and latch rod with said door in raised position with the opposite end of said support and latch rod engaging said side section, means on said roof section and said side section cooperating with said support and latch rod for releasably securing said rods in a position in overlying engagement with said doors with said doors in closed position.

2. A device as claimed in claim 1 wherein the means on said roof section cooperating with said rod comprises an L-shaped latch plate for detachable engagement with the upper end of said rod and the means on said side section cooperating with said rod comprises a plate secured to said side section with the lower end of said rod pivotally mounted in said plate for pivotal movement about a horizontal axis.

3. A device as claimed in claim 2 wherein a prefabricated partition is positioned between said side sections for dividing said enclosure into a pair of pens.

4. A device as claimed in claim 3 wherein said prefabricated partition is detachably secured to said front and said rear frames intermediate of said side sections.

5. A device as claimed in claim 4 wherein a skid is detachably secured to said prefabricated partition for engaging the ground intermediate the skids on said side section.

* * * * *